United States Patent [19]
Symosek et al.

[11] Patent Number: 5,424,556
[45] Date of Patent: Jun. 13, 1995

[54] GRADIENT REFLECTOR LOCATION SENSING SYSTEM

[75] Inventors: Peter F. Symosek, Shoreview; Scott A. Nelson, Eagan, both of Minn.

[73] Assignee: Honeywell Inc., Minneapolis, Minn.

[21] Appl. No.: 159,391

[22] Filed: Nov. 30, 1993

[51] Int. Cl.⁶ .............................................. G01B 11/26
[52] U.S. Cl. ................... 250/561; 250/206.2; 250/203.2; 356/141.5; 345/8
[58] Field of Search .............. 250/561, 206.1, 206.2, 250/203.2; 356/375, 400, 139.03, 141.1, 141.2, 141.5; 345/7, 8

[56] References Cited

U.S. PATENT DOCUMENTS

| | | | |
|---|---|---|---|
| 3,917,412 | 11/1975 | Stoutmeyer et al. | 356/141.5 |
| 4,111,555 | 9/1978 | Ellis | 356/139.03 |
| 4,475,814 | 10/1984 | Marche | 356/138 |
| 4,649,504 | 3/1987 | Krouglicof et al. | 364/559 |
| 4,956,794 | 9/1990 | Zeevi et al. | 364/559 |
| 5,208,641 | 5/1993 | Mocker et al. | 356/5 |

Primary Examiner—David C. Nelms
Assistant Examiner—John R. Lee
Attorney, Agent, or Firm—John G. Shudy, Jr.

[57] ABSTRACT

A multi-band high-speed videometric head tracking system having a gradient reflector array attached to a helmet on a person's head, ultraviolet light source emitting light which is reflected by the reflector array to a video camera which provides an image to a spot location estimator providing accurate locations of spots in the image representing the reflectors' reflecting light to image location accuracies within a pixel of the image. The location information from the spot location estimator goes to a track point 3-D location and helmet LOS estimator that provides location and orientation information to a Kalman Filter that accurately estimates and predicts the helmet position at faster rates than would be possible for a process that uses just the image-based measurements of the helmet.

4 Claims, 9 Drawing Sheets

GRADIENT REFLECTOR LOCATION SENSING SYSTEM

BACKGROUND OF THE INVENTION

The invention relates to helmet mounted display systems and particularly to helmet or head tracking systems.

Helmet-mounted display systems frequently have both gimbaled sensors and weapons that must follow the line of sight of the pilot and thus require accurate head tracking. There are various kinds of optical and magnetic helmet tracking systems. The magnetic tracking systems are presently the more accurate and robust systems. Several disadvantages of magnetic head trackers are the need to map the metal in the cockpit of the craft and the limited update rates. Magnetic head tracking systems work in areas where the amount of metal structure is limited. Application of such systems for combat vehicles or tanks is impractical because the metal structure of the tank or combat vehicle results in the magnetic head trackers as being untenable. Further, the confined, vibrational environment proves existing optical systems to be as unlikely to solve the combat vehicle or tank head tracking problem.

SUMMARY OF THE INVENTION

The present invention is a multi-band high-speed videometric head-tracking system that incorporates a gradient reflector array, rigid-body Kalman filter motion predictor algorithm processor and a low-cost camera which senses source light reflected by the gradient reflector array. The reflectors include intensity gradient information as well as position information. The subpixel spot location estimator algorithm uses the gradient information from the reflectors to increase the accuracy of the reflector locator algorithm. The Kalman filter estimates the location of the helmet and the helmet line of sight to a greater accuracy than is attainable by image measurements alone by accounting for the natural coupling between the translational and rotational motions of the head and also reduces the noise in the system and the motion predictor algorithm extrapolates the helmet location and line of sight at a higher rate than the measurement (update) rate.

The present invention is both accurate and cost effective. It is not affected by heavy magnetic environments and does not use elaborate optics. The system estimates boresight to a marking with a digital signal-processing algorithm. Helmet rotation and translation are calculated using the traditional principles of perspective images.

DESCRIPTION OF THE PREFERRED EMBODIMENT

Figure 1:
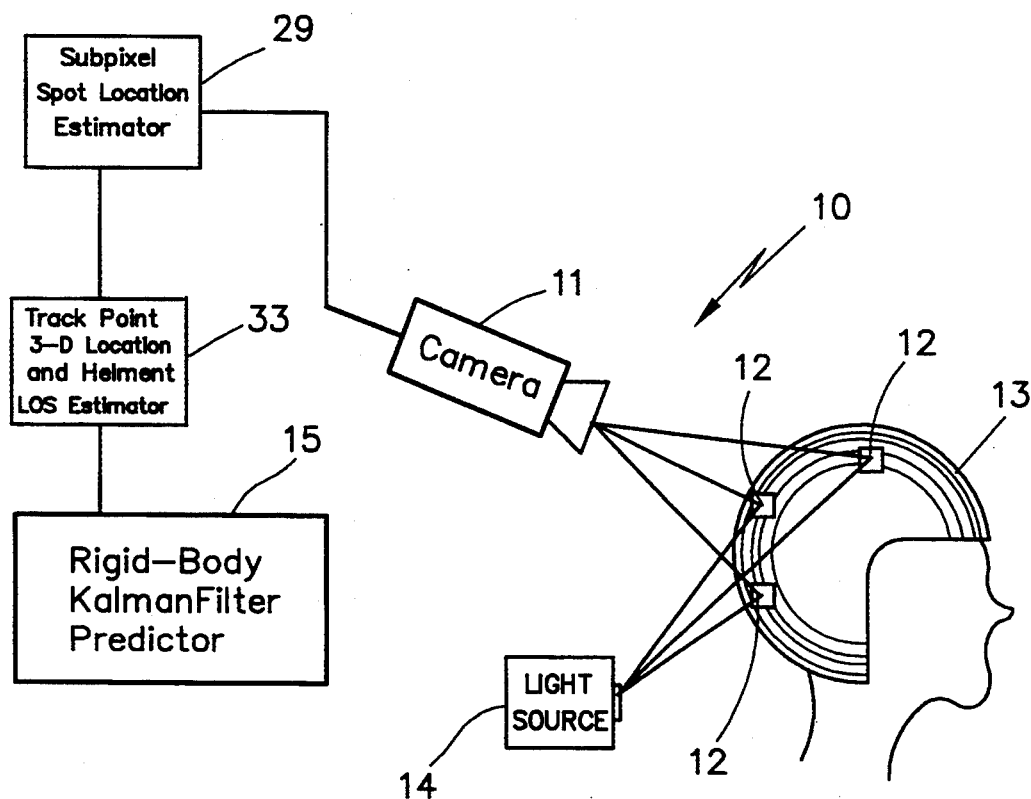
FIG. 1 is a layout of the basic components of the tracker system.

Videometric head tracker system 10 in FIG. 1 has an ultraviolet (UV) sensitive camera 11 that senses reflections from gradient reflectors 12 which are situated on helmet 13. Light source 14 illuminates gradient reflectors 12 so as to become sources or spots 12 of light. The output of camera 11 goes to a subpixel spot location algorithmic estimator 29. Estimator 29 averages out the errors of the feature or location estimates to provide better than single pixel resolution, that is, "subpixel" spot location, of spots 12. The output of estimator 29 is estimated image plane 28 (of FIG. 6) coordinates of the centroid of each gradient reflector 12 of the configuration of five gradient reflectors (which may be another number of reflectors such as three or four). The estimated image plane 28 coordinates of each gradient reflector 12 are transferred to a track point three dimensional (3-D) location and helmet line-of-sight (LOS) calculation algorithmic processor 33. LOS is the orientation of helmet 13. The track point 3-D location and helmet line-of-sight data, calculated using the equations of perspective, go to a rigid body kinematics Kalman filter/predictor 15. Kalman filter/predictor 15 is a processor that provides representations of the general six-degree-of-freedom kinematics of helmet 13 and the pilot's head. The estimated states include location, velocity, angle, and angular rates of rigid-body (helmet) 13 as a function of external forces, specifically gravity and the forces exerted by the muscles in the pilot's head. System 10 relates the image measurement error for spot location and angle of orientation to the Kalman filter residuals using a unique spot design in which the intensity of the reflective signal varies across one axis of gradient reflector 12 as shown by graph 16 of FIG. 2a. Spots 12 have contrast gradients that peak in the center of the reflector structure in order to assure the most accurate derivation of spot location.

Subpixel spot location estimator 29 operates with analog serial image 28 data, in an RS170 format, from camera 11, from an analog-to-digital converter in a DATACUBE MAXVIDEO 20 processor. The digital signal from the converter goes to a DATACUBE card 56, model MAXVIDEO 20, for processing to determine threshold image 28 intensities at the 99.5 percent level in section 46 (see FIG. 7) and to section 47 to establish the location of the strongest orthogonal edges 77 relative to roof edges 76 of the detected gradient patterns 16 of reflectors 12, using a Canny edge operator for image feature detection that detects edges of gradient patterns 16 or spots 12. Only one spot 12 is operated on at a time. The output from section 46 goes to a model APA512 card made by an Australian Company, Vision Systems International, Pty., Ltd. The APA512 card 57 is utilized to calculate the minimum orthogonal distance squared error line for roof edges 76 of gradient patterns 16 of reflectors 12, in section 48. The outputs of sections 47 and 48 go to section 49 of INTEL i860 processor card 58, to identify a parallel pair of lines 78 that has the largest average gradient magnitude. An approximation line 80 is superimposed. The output of section 49 goes to a decision section 50 which passes the output on to section 52 if such pair of parallel lines 78 is identified, or to section 51 if such pair of parallel lines is not identified. A pair of lines 79 (FIG. 2b) may be found but these would be a false detect because they would not be the pair of lines having the largest average gradient. If the pair of parallel lines is found, then section 51 establishes a gradient pattern center location as an image plane location midway between the intersection points of the minimum orthogonal distance line as calculated in section 48 of card 57 and the orthogonal edges 77 as established in section 47 of card 56. If the pair of parallel lines is not found, then section 52 establishes a conventional gradient pattern center location as a centroid of a binarized gradient pattern image. An output from section 51 or 52 goes to section 53 to find the left-most gradient pattern and then to identify corner points via a leftward bearing search. In addition to section 49, sections 50, 51, 52 and 53 are incorporated in INTEL i860 card 58. The output of section 53 goes to section 31 to calculate helmet 13 coordinates and line of sight. Section 31 is in INTEL i860 card 58 as part of track point 3-D location and helmet line of sight algorithmic processor 33. Application-dependent parameters for the track point 3-D location and helmet line of sight algothimic procesor 33 are output from section 54, including field of view, image plane dimensions, gradient pattern constellation dimensions and focal length, is entered into section 31. These application-dependent parameters are stored in the memory of card 58. The six reference coordinates (3 coordinates plus 3 line of sight orientation coordinates) of the unique reference 38, of constellation 45, and orientation of helmet 13 is calculated. The output of section 31 of device 33 goes to Kalman filter/predictor 15. Filter/predictor 15 is mapped to a portion of INTEL i860 card 58.

Figure 2A:
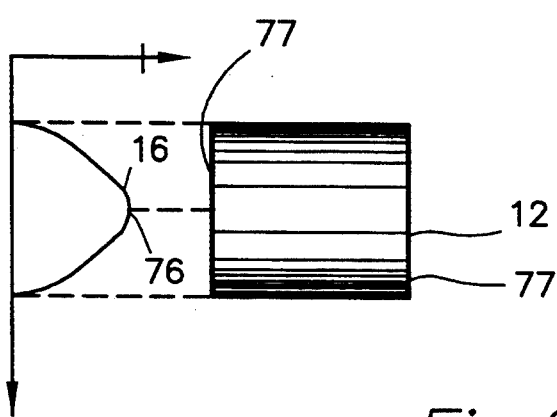
FIGS. 2a and 2b illustrate a gradient reflector.
Figure 2B:
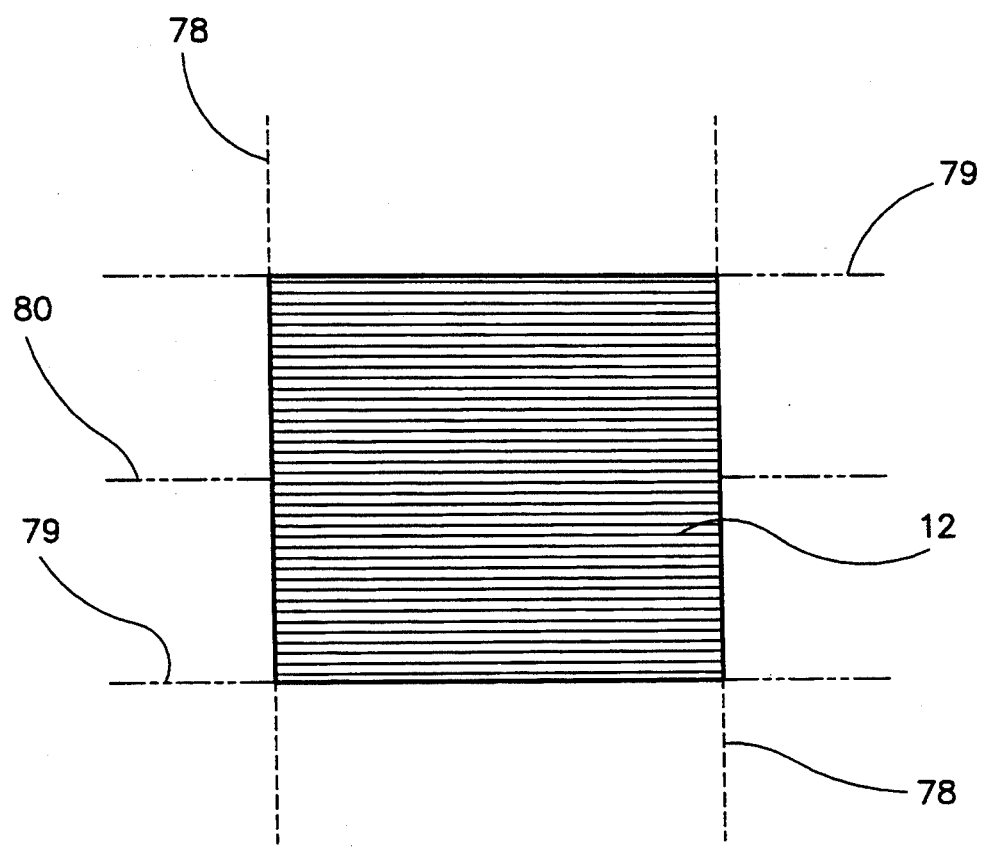

3M 198 high-reflectance or retroreflectance tape may be used for retroreflectors 12. The retroreflectance tape absorbs in the ultraviolet range due to a polymer overcoat. Applying varying thicknesses of polymer overcoat to the high reflectance materials results in a symmetrical gradient reflector whose center has no polymer overcoat and thus has the highest reflectance. The pattern is printed on a cellophane-like material and then is bonded to a resin circuit board. The reflectance is supposed to decrease linearly from the center by applying appropriately thicker absorbing polymer overcoat across reflector 12. Actually, the curve showing the change of reflectance along one dimension of reflector 12 appears to have a quadratic shape 16 as indicated in FIG. 2a.

Figure 3:
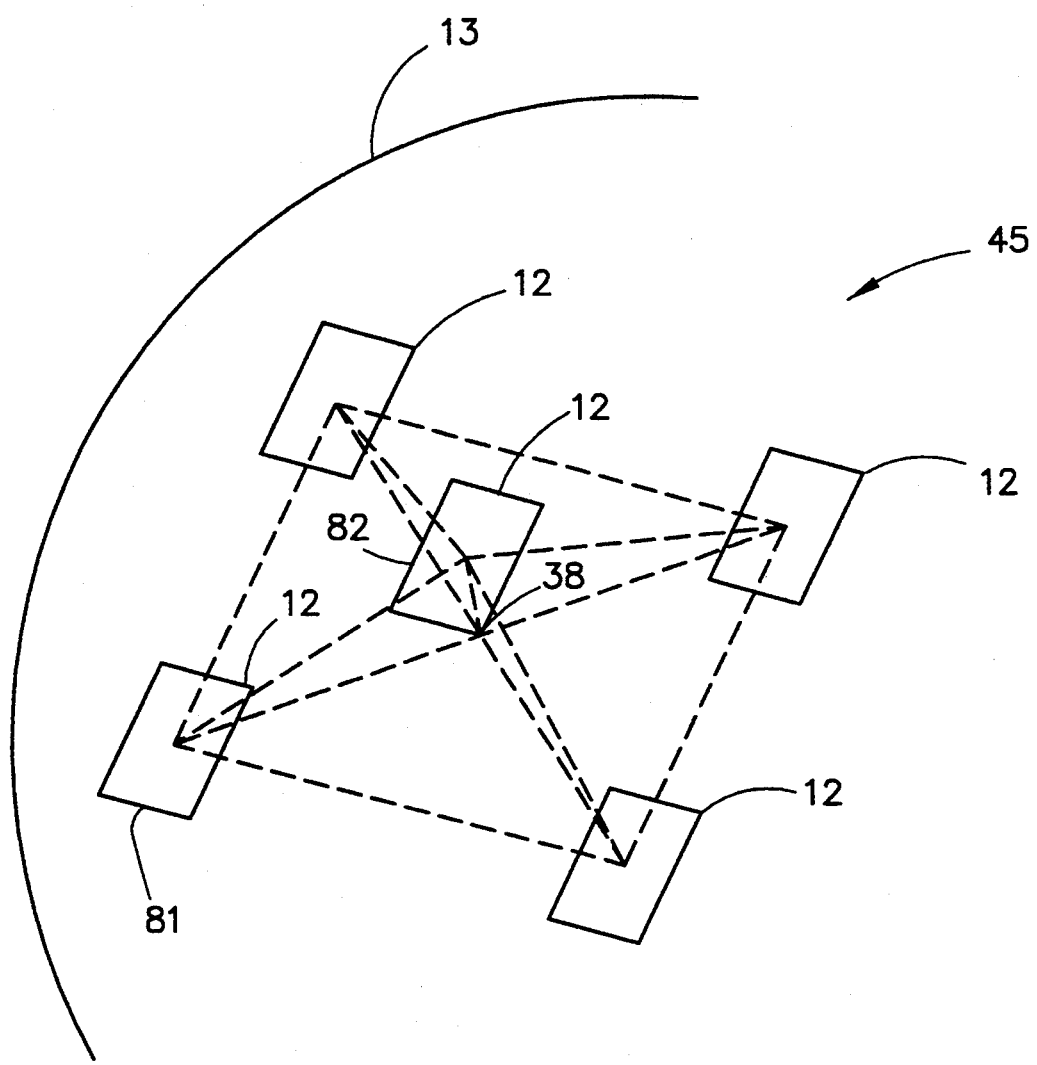
FIG. 3 reveals a view of a constellation of gradient reflectors.

The location of the gradient patterns of constellation 45 of five spots or reflectors 12, shown in FIG. 3, is used for calculation of helmet 13 three dimensional (3-D) location and orientation. The estimates of the 3-D location and coordination frame orientation are transferred to a rigid-body Kalman filter/predictor 15 to obtain smooth, minimum mean-square-error estimates of parameter data or, in other words, temporal- or time-averaged estimates of parameter data. The gradient pattern of center reflector 12 is orthogonal to the gradient patterns of the other four reflectors 12.

Camera 11 may be one of various kinds of cameras. System 10 is based on a 60-Hz non-interlaced CCD camera that is sensitive to the ultraviolet (UV) (250-400 nanometers (nm)) and has a standard RS-170 video output. The silicon lens of camera 11 is replaced with a quartz lens for UV detection. A TEXAS INSTRUMENTS INC. (TI) MC780 PHU camera is a preferred camera 11 in system 10. The MC-780 PHU has 755×488 active photosites with a resolution of 500×350 TV lines. The manufacturer, TI, substituted the standard CCD glass window with a quartz (fused $SiO_2$) window to provide the necessary ultraviolet sensitivity. TI camera 11 is a solid-state monochrome television camera that employs TI TC245 frame-transfer charge-coupled image sensor. TI MC780 PHU camera 11 has a 25% quantum efficiency (QE) which extends down to 220 nm. The TI CCD is also rated for a 25% QE at 365 nm, which makes it useful at the latter wave length as well. Another preferred and similar camera is the remote head, MC780 PHR, having the same specifications as the MC780 PHU, but with smaller dimensions.

Light source 14 provides ultraviolet illumination for system 10. Both 254 nm and 365 nm sources have been examined. The 365 nm source has several advantages over the shorter wave length source. First, the 365 nm source has a potentially safer wave length for human interaction (i.e., eyes and skin exposure), and second, it provides less stringent requirements for the optics in that the lens designs are easier to achieve and are less expensive than the lens systems for the 254 nm source. Even though the 254 nm wave length system has the advantage of a lower noise background, experiments show the signal-to-noise ratio feature to be minimal in view of the additional features provided by the 365-nm wave length system. The 365-nm lamp of choice for source 14 is an ultraviolet quartz pencil lamp having a length of 2-⅜ inches with a ⅜ inch outside diameter and a weight of 2 ounces. The lamp irradiates 180 microwatts per square centimeter at 6 inches and provides enough light to distinguish the targets on a monochrome monitor. A typical lamp is rated for 5000 hours of operation. The fused quartz envelopes have excellent ultraviolet transmission properties, with the isolated spectral lines being strong and well separated. Such a lamp is also cool burning.

The diffused and specular reflectance of a standard combat vehicle crew (CVC) helmet was measured with a CARY spectrophotometer with an integrating sphere attachment. The average reflectance is 4.4% in the ultraviolet (200-400 nm) waveband. A highly diffuse reflector or retroreflector with a 60% reflectivity will give a signal-to-noise ratio of 60/4.4 or 13.6. A signal to noise ratio of 10 is sufficient for the spot positioning algorithms of subpixel spot location estimator 29.

The following table shows f-numbers (f# vs. aperture opening in mm) calculated for TI MC780 PHU (755×488) camera 11, which has a diagonal 8-mm active area, as a function of range (R) in cm, focal length (fL) in mm, and field of view angle (theta) in degrees.

| R (cm) | Theta (deg.) | fL | f# (10) | f# (15) | f# (20) | f# (25) | f# (30) |
| --- | --- | --- | --- | --- | --- | --- | --- |
| 15.2 | 90.19 | 3.98 | 0.40 | 0.27 | 0.20 | 0.16 | 0.13 |
| 20.3 | 73.84 | 5.32 | 0.53 | 0.35 | 0.27 | 0.21 | 0.18 |
| 25.4 | 61.97 | 6.65 | 0.67 | 0.44 | 0.33 | 0.27 | 0.22 |
| 30.5 | 53.13 | 7.99 | 0.80 | 0.53 | 0.40 | 0.32 | 0.27 |
| 35.6 | 46.38 | 9.33 | 0.93 | 0.62 | 0.47 | 0.37 | 0.31 |
| 40.6 | 41.18 | 10.64 | 1.06 | 0.71 | 0.53 | 0.43 | 0.35 |
| 45.7 | 36.91 | 11.97 | 1.20 | 0.80 | 0.60 | 0.48 | 0.40 |

Figure 4:
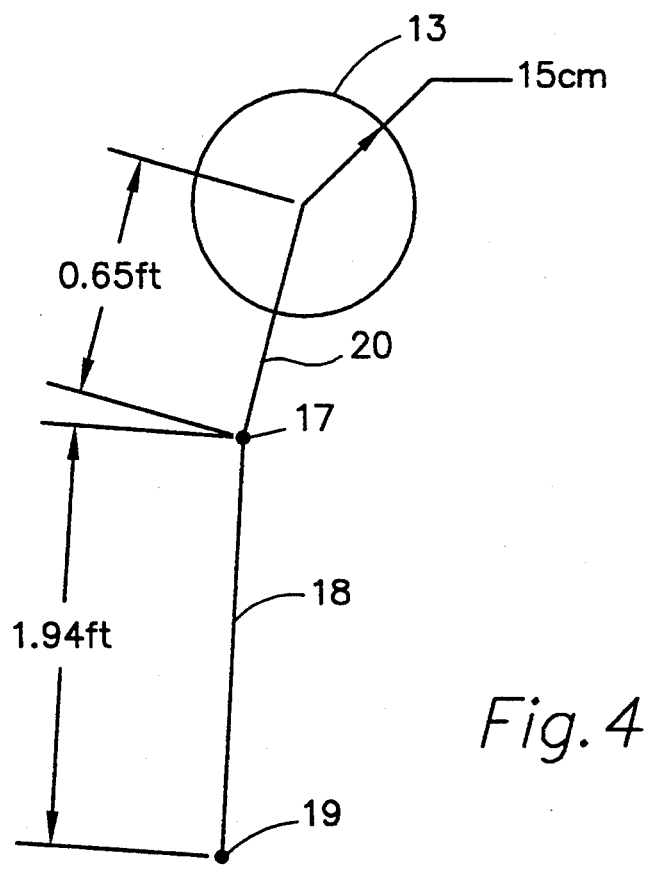
FIG. 4 is a diagram of a rigid-body geometric configuration of the head, neck and torso.

The body-axis or coordinate system establishing the helmet 13 location and orientation is located at a point 17 between the pilot's shoulders at the base of the neck as shown in FIG. 4. The head and neck, to a first-order approximation are characterized as a pendulum 20 that is attached to the torso at the base of the neck by a pivot joint 17. FIG. 4 is the rigid-body geometric configuration of the head, neck and torso used for trajectory file calculation. Since the head and neck are extrapolated to be a rigid body and if the location and line-of-sight (LOS) orientation of the body-axis coordination system are known, the coordinates and orientation of thin-film spots 12 applied to helmet 13 are established uniquely. The first order approximation for the dynamics of torso 18 is for the assumption that torso 18 is a rigid body attached to the hips by a pivot joint 19, and that the hips are stationary relative to the vehicle coordinate frame because of the seat safety restraints. The radial dimensions of the pendulums 18 and 20 used by Kalman filter/predictor 15 to establish trajectories/orientations from image feature location measurements are obtained from tables of average human frame dimensions. For males, the average height of the shoulders above the hips is 59 centimeters or 1.94 feet and the average height of eye level above the hips is 79 centimeters or 2.59 feet. Helmet 13 is approximated as a sphere of a radius of 15 centimeters (5.9 inches) with its center 55 located at the extreme end of the second pendulum 20, which represents the head and the neck, respectively.

Figure 5:
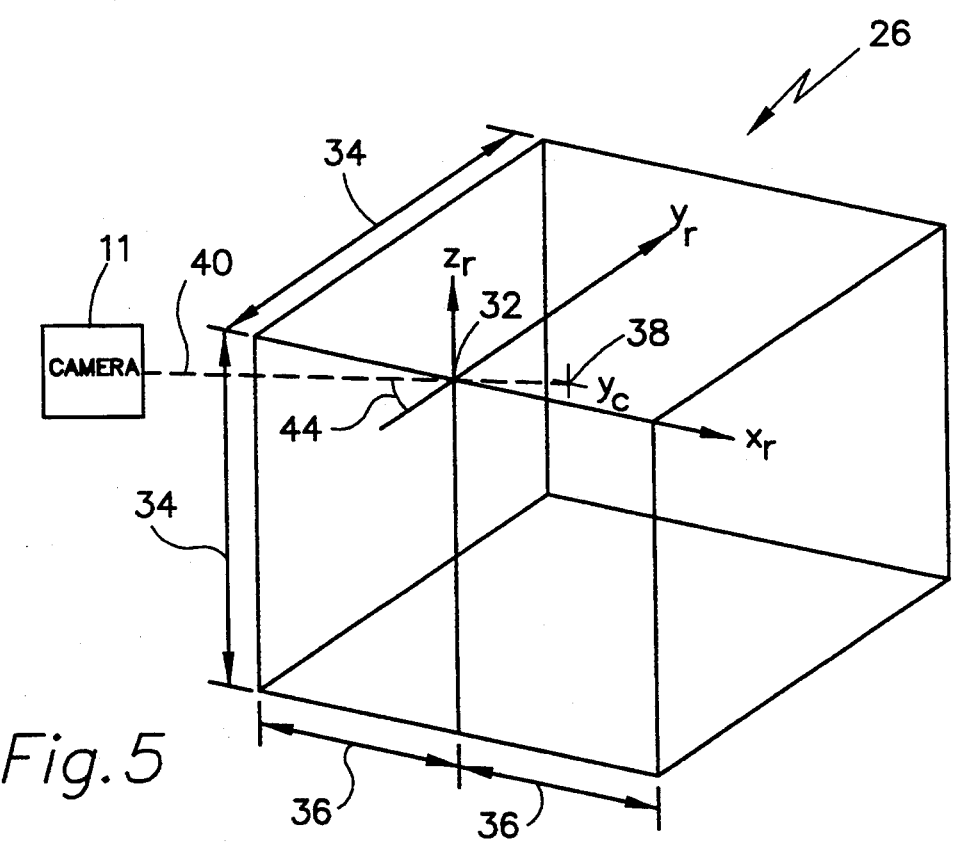
FIG. 5 shows the geometry of a head tracker box.

The geometry of a head tracker box 26 is shown in FIG. 5. Dimensions 34 are 12 inches and dimensions 36 are 6 inches. Camera 11 is located so that the optical axis 40 intersects the point $[0, 0, 0]^T$ at location 32, and point $[0, 0.23, -0.5]^T$ feet at location 38. The camera 11 depression angle 44 is $-25°$.

Figure 6:
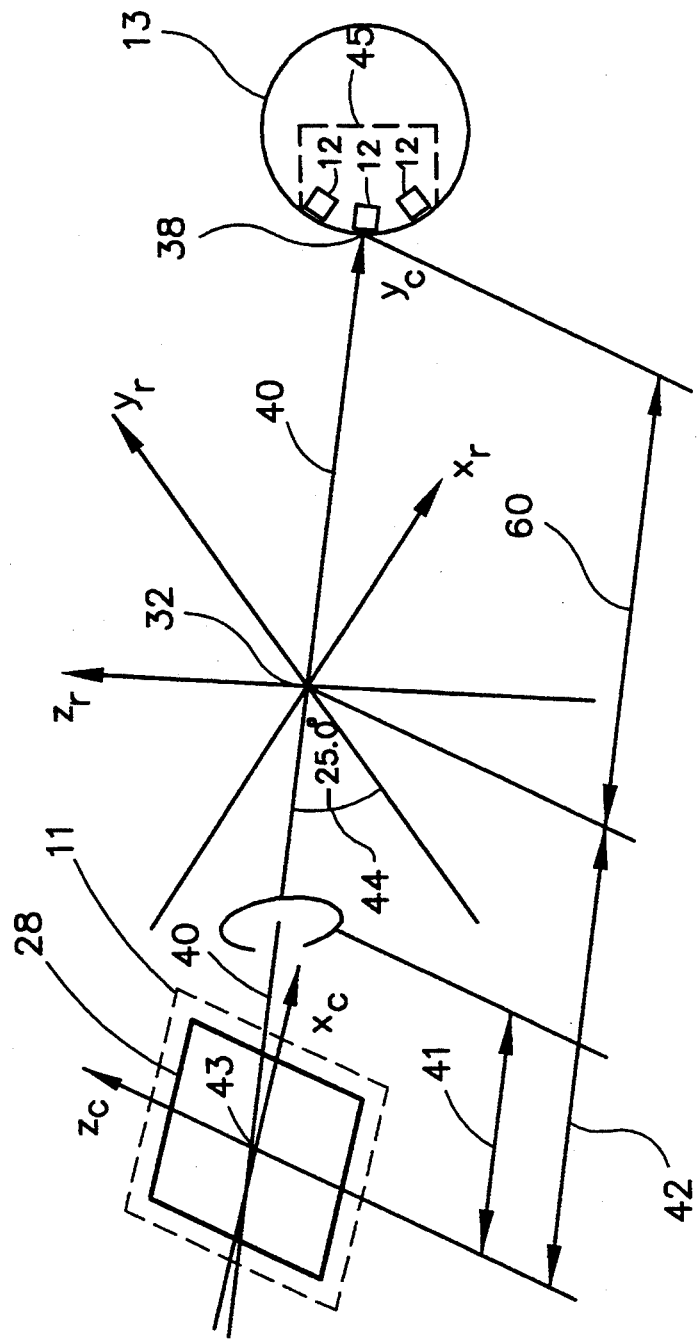
FIG. 6 is a diagram showing the relative locations of the camera and vehicle coordinate systems.

The relative location of camera 11 coordinate system ($x_c$, $y_c$, $z_c$) at origin 43 with respect to the coordinate system ($x_r$, $y_r$, $z_r$) at origin 32 of the vehicle is shown diagrammatically in FIG. 6. FIG. 6 depicts the nominal imaging configuration of camera 11. Ultraviolet camera 11 is oriented so that it views center 38 of head tracker box 26 of FIG. 5. Origin 43 of the camera 11 coordinate system is located at the center of image plane 28, the $x_c$ and $z_c$ axes are square to the orthogonal edges of image plane 28, and the $y_c$ axis is parallel to the optical axis 40. Distance 41 is the focal length. Origin 43 of camera 11 coordinate reference frame is located at a distance 42 from origin 32 of the reference coordinate system ($x_r$, $y_r$, $z_r$), where distance 42 is a user-specified parameter. Distance 60 is the length between origin 32 and constellation 45 reference point 38. The coordinates ($x_c$, $y_c$, $z_c$) of the image for each vertex of gradient reflectors 12 is calculated using the equations of perspective.

The image plane 28 coordinates $r_i = [x_c z_c]^T$ three-dimensional location $r_i^c = [x_c y_c z_c]^T$ in the camera 11 coordinate system, are obtained with the following equation:

$$r_i^c = \begin{bmatrix} x_c \\ z_c \end{bmatrix} = \begin{bmatrix} \dfrac{x_c F}{y_c - F} \\ \dfrac{-z_c F}{y_c - F} \end{bmatrix};$$

where $x_c$ is the x coordinate of the camera 11 coordinate system of the image of the three-dimensional coordinate $r_i^c$, $z_c$ is the z coordinate of the camera 11 coordinate system of the image of the three-dimensional coordinate $r_i^c$, $x_c$ is the x coordinate of the camera 11 coordinate system of the three-dimensional coordinate, $y_c$ is the y coordinate of the camera 11 coordinate system of the three-dimensional coordinate, $z_c$ is the z coordinate of the camera 11 coordinate system of the three-dimensional coordinate, F is the focal length of camera 11, and the transpose of a vector is denoted by the superscript T.

Center 43 of detector array 45 is located with the midpoint of the array in the x and z directions coincident with the location where the optical axis 40 intersects image plane 28. The edges of image plane 28 detector array are square with camera 11 coordinates ($x_c$, $y_c$, $z_c$).

Figure 7:
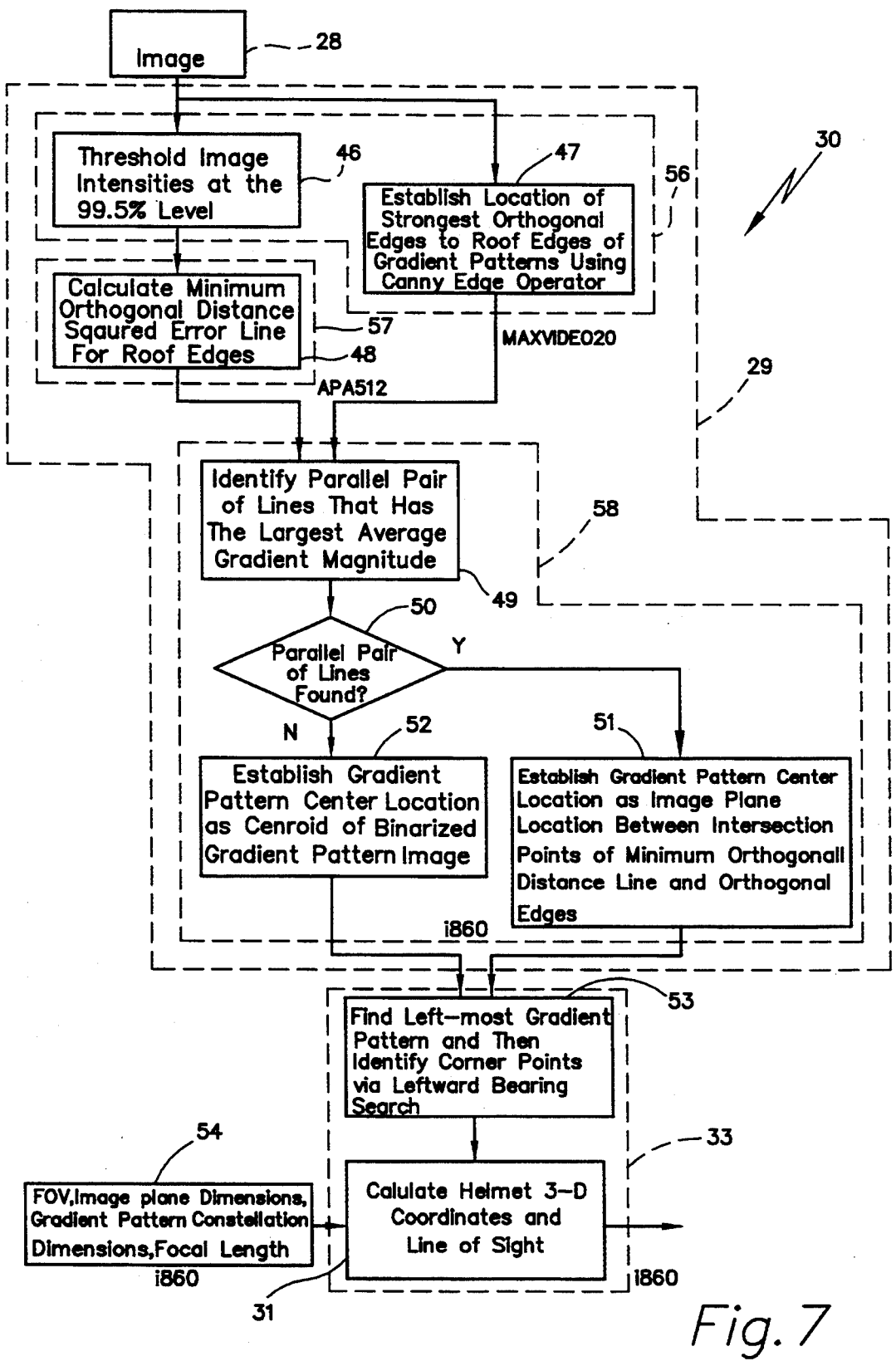
FIG. 7 is a block diagram of the subpixel spot location estimator algorithm and the track point 3-D location and helmet line of sight calculation.

FIG. 7 is a block diagram of subpixel spot location algorithmic estimator 29 and track point 3-D location and helmet line of sight calculation 33. The function of estimator 29 is applied separately to each spot 12 of constellation 45. The base line approach uses the uniquely identifiable attributes of gradient patterns 16 to estimate their locations with greater accuracy and reliability than is possible with a traditional centroid estimation approach.

Shown in the feature data calculation stage 30 of FIG. 7, the images are transformed into feature (iconic) data by two generic, that is, customary or traditional, feature detection stages: thresholding 46 and edge detection 47. The purpose of the thresholding operation 46 is to isolate the gradient pattern from background noise and to obtain a first-order estimate for the orientation of the ridge of gradient pattern 16. Operation 46 identifies the 0.5 percent of the scene's light intensity that is from each reflector 12, at a detection level that excludes the remaining 99.5 percent of the light over the gray scale of the image. The Canny edge operator 47 (an estimator of image gradient) is used to detect the abrupt orthogonal edges 77 to roof edge 76 of each gradient pattern 16. The aggregation of features obtained from these stages can be used to calculate the centroid of gradient pattern 16 with greater accuracy than might be possible by mapping the image of gradient pattern 16 into a binary image and conventionally calculating the centroid of the thus obtained region for the following reasons. Because the imaging system is required to have a wide field of view to view the entire head tracker box 26, the effects of perspective distort the images of gradient patterns 16. When an image of a square region is obtained with a perspective imaging system, the region is distorted into the shape of a parallelogram. Centroid estimates for distorted gradient patterns are not guaranteed to estimate the true centroid due to pixel quantization and noise. Thus, an alternate approach that identifies unique and high signal-to-noise ratio attributes of gradient patterns 16 is required.

Next stage 48 of transforming the image into features is to calculate the image plane 28 orientation of the minimum squared orthogonal distance metric line for the binarized images of gradient patterns 16. The orthogonal distance metric is defined as the perpendicular distance from each quantized image location of the digitized or binarized image to the minimum error line or minimal orthogonal distance error line. This approximation line 80 on the image provides the location and slope (i.e., orientation) of a detected reflector 12. The slope and reference coordinates for this line are determined by calculating the scatter matrix (which is a squared error matrix of the spatial dispersion of the binary region of the roof or orthogonal edge of the gradient pattern 16) of the binarized region and establishing the orientation of the line as that eigenvector (i.e., a mathematical term for statistical behavior of spatial or binarized region of the matrix) of the scatter matrix that corresponds to the largest eigenvalue (which is a blending percentage of the eigenvector for the principal component decomposition of the matrix). The classic relation is $(M - I\lambda)v = 0$, where M is the matrix, I is the identity matrix, $\lambda$ is the eigenvalue and $v$ is the eigenvector. The reference coordinate of the line is always the centroid of the binarized region. This approach to estimation of gradient reflector ridge orientation is used because the derived image plane orientation is invariant to location (the x and z coordinates of the quantized image region), whereas approximations calculated by linear regression are not.

The next step 49 of feature detection is to establish which lines of the array of lines, for instance, pairs 78 and 79 of lines, cued by the Canny edge operator 47 are the parallel pair of abrupt edges of gradient patterns 16 that are orthogonal to roof edge 76. The criteria used to distinguish these lines are restraints on angular offset from true parallel, restraints on angular offset from square with roof edge 76, and restraints on length differences between the pairs of lines. Border edges 77 have the largest edge strength so as to eliminate false detects.

The next step 50 is to determine whether a pair of parallel lines can be found. If a pair of parallel lines, such as pair 78 (since pair 79 is a false detect), is found which is compatible with the specific restraints applied, then, in step 51, the location of the intersection of the roof edge approximation line 80 with the pair of lines 78 is calculated. The gradient 16 reflector 12 centroid coordinate is obtained as the image plane location midway between the intersection points, along roof edge 76 approximation line 80. If a pair of parallel lines is not found, then, in step 52, the centroid of the binarized image component for gradient pattern 16 is used, using conventional calculation techniques which use no data of the gradient 16 information developed above.

In step 53, the mapping from image coordinates of the five gradient patterns 16 to the pyramid configuration that the algorithms use is obtained by scanning the coordinates of the detected gradient patterns for that gradient pattern whose x coordinate is the minimum of the five coordinates. Because the five-gradient-pattern configuration is restrained to be oriented at an angle of 0 to 45 degrees with respect to image plane 28, the gradient pattern 81 cued as being furthest left must be a corner point of the base plane of constellation 45 (in FIG. 3). The corner point is used to reference the current frame to a previous frame to match reflector 12 (spot) locations of the respective frames of images 28. The remaining three corner points are discriminated by executing a leftward bearing search from the first corner point. The gradient pattern not identified as a corner point is the gradient pattern 82 at the pyramid's peak; the pyramid corner points are defined by gradient patterns 16. The particular gradient pattern 16 designated as the furthest left pattern 81 may be a different reflector 12 in another frame or time.

Step 31 incorporates the calculation of the helmet 13 three-dimensional coordinates and line of sight, with information from step 53 and parameters from source 54. The estimated helmet 13 coordinate system translation and LOS are output as a serial list of floating-point numbers $[x_r, y_r, z_r, psi, theta, phi]$, at each frame time, where $r = [x_r, y_r, z_r]$, psi, theta, phi which represent the reference coordinate frame coordinates, yaw, pitch, and roll, respectively, of the body coordinate system relative to the reference coordinate system.

The single-frame-derived positions and angles are filtered to reduce the effects of random measurement error and to allow extrapolation of the positions and angles between video frames by the Kalman filter/predictor 15. These extrapolated quantities are used to increase the apparent output data rate from the 60 Hz video rate to approximately 400 Hz. The extrapolated quantities also allow the image plane position of a gradient reflector 12 to be accurately predicted on the basis of past video frames, reducing the image processing throughput requirements.

Figure 8:
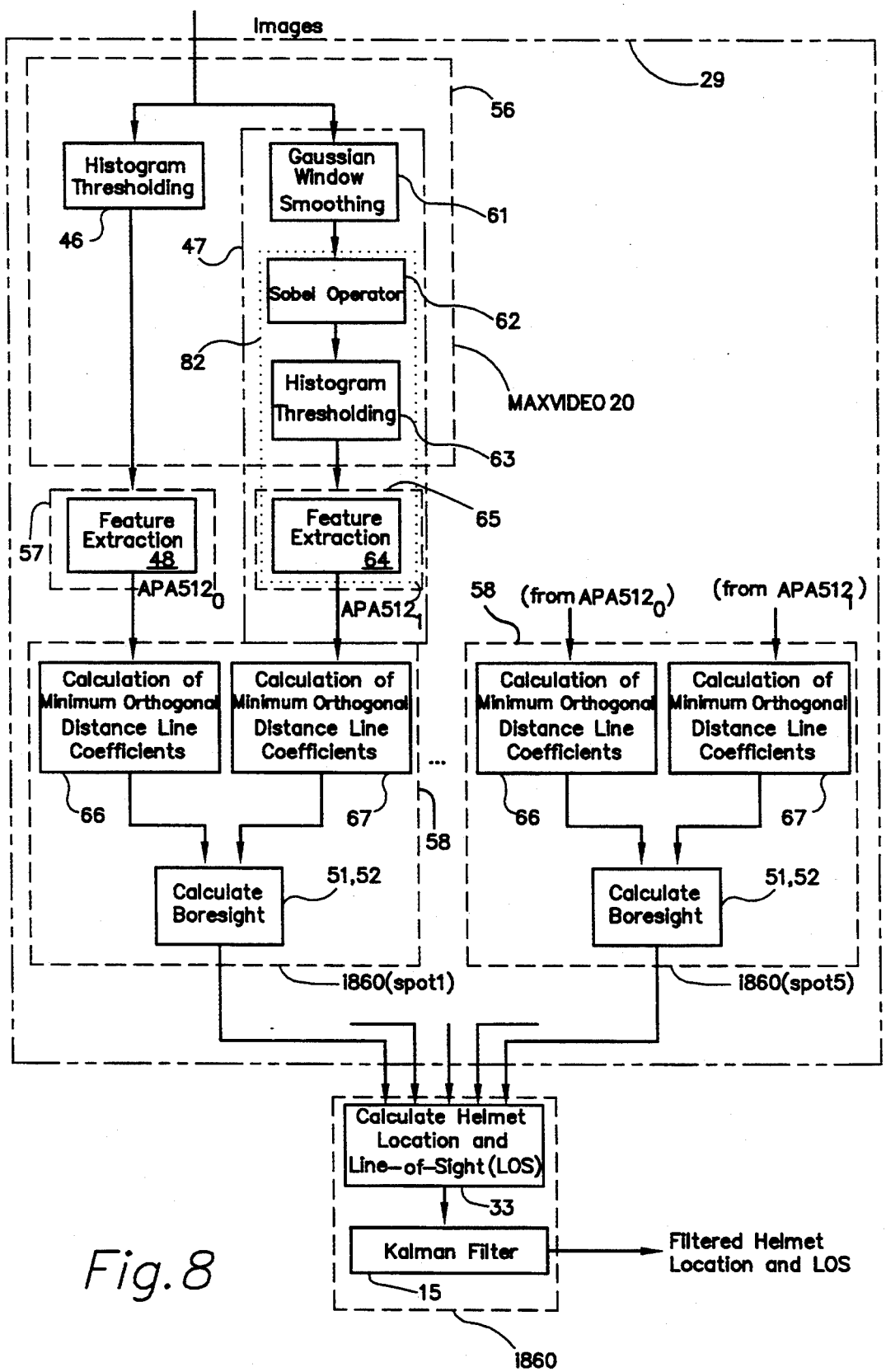
FIG. 8 shows hardware and the corresponding functions of the tracker.

FIG. 8 shows the invention and its functions in conjunction with corresponding hardware. Item 56 is a DATACUBE MAXVIDEO 20. Function 47 contains Gaussian window smoothing 61, Sobel operator 62, histogram thresholding 63 and feature extraction 64. Gaussian window smoothing blurs the image to eliminate the noise; the Sobel operator is an edge detector; histogram thresholding determines the 99.5 percentile of the total distribution of gray levels of the image; and the Sobel operator, histogram thresholding and feature extraction constitute a Canny edge operator 82. Function 46 contains histogram thresholding. Item 57, denoted $APA512_0$, in FIG. 8, where subscripts are used to distinguish among multiple boards of the same type, is a Vision Systems International Pty., Ltd. APA 512 which contains feature extraction 48 which picks out the roof edge of spot 12. Feature extraction 64 is carried out by item 65, $APA 512_1$. The outputs of items 57 and 65 go into device 58 which encompasses block 66 which involves the calculation of minimal orthogonal distance line coefficients from information out of device 57; and function 67 for calculation of minimal orthogonal distance line coefficients from information out of device 65. Feature extraction 64 provides the orthogonal edges of reflectors 12. Functions 66 and 67 transform image coordinates of binarized regions of features to an edge equation or line representation, or map features to a linear edge representation. The outputs of function 66 and 67 go into calculate bore sight portion 51 and portion 52, respectively. Functions 51 and 52 provide the angular coordinates of the center of each spot 12. There are five blocks 58 each of which are mapped to a separate i860, where individual hardware components are distinguished by subscripts which designate processing for each spot in FIG. 8, for the five spots of constellation 45 of reflectors 12. The outputs go into function 33 for calculating helmet 13 location and orientation and line of sight of the helmet. The resulting output of item 33 goes to Kalman filter 15. Block 33 and Kalman filter 15 are executed by a dedicated i860. The output of the system 10 is from Kalman filter 15 to provide inputs to a fire control computer or to imaging system servos.

Figure 9:
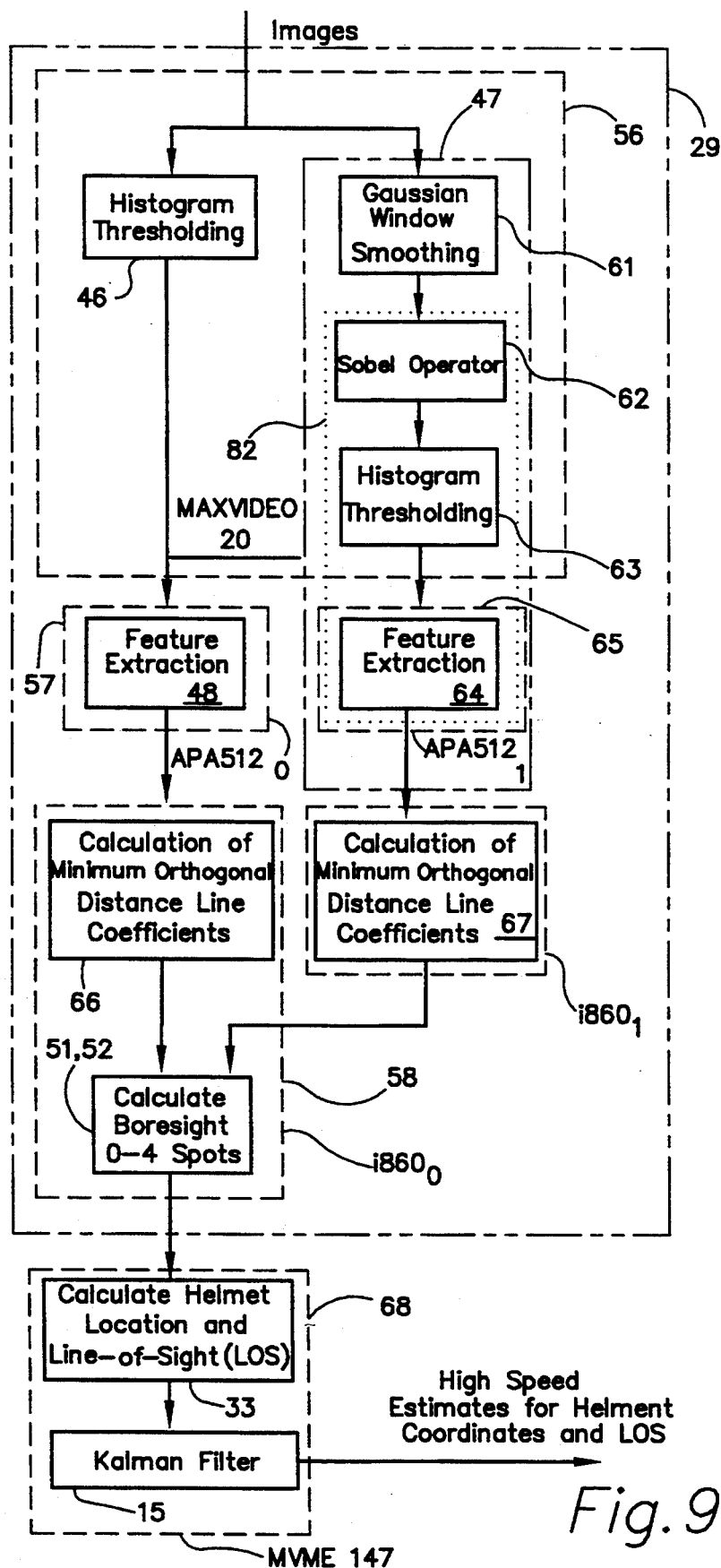
FIG. 9 shows another version of hardware and the corresponding functions of the tracker.

FIG. 9 is similar to FIG. 8 except that calculation of minimal orthogonal distance line coefficients 66, 67 and calculation of boresight 51, 52 are performed by the same hardware for each spot 12. Also, function 33 for calculating helmet location and line of sight, and Kalman filter 15 are on portion 68 of device MVME 147 which is a MOTOROLA single board 68030 computer.

Figure 10:
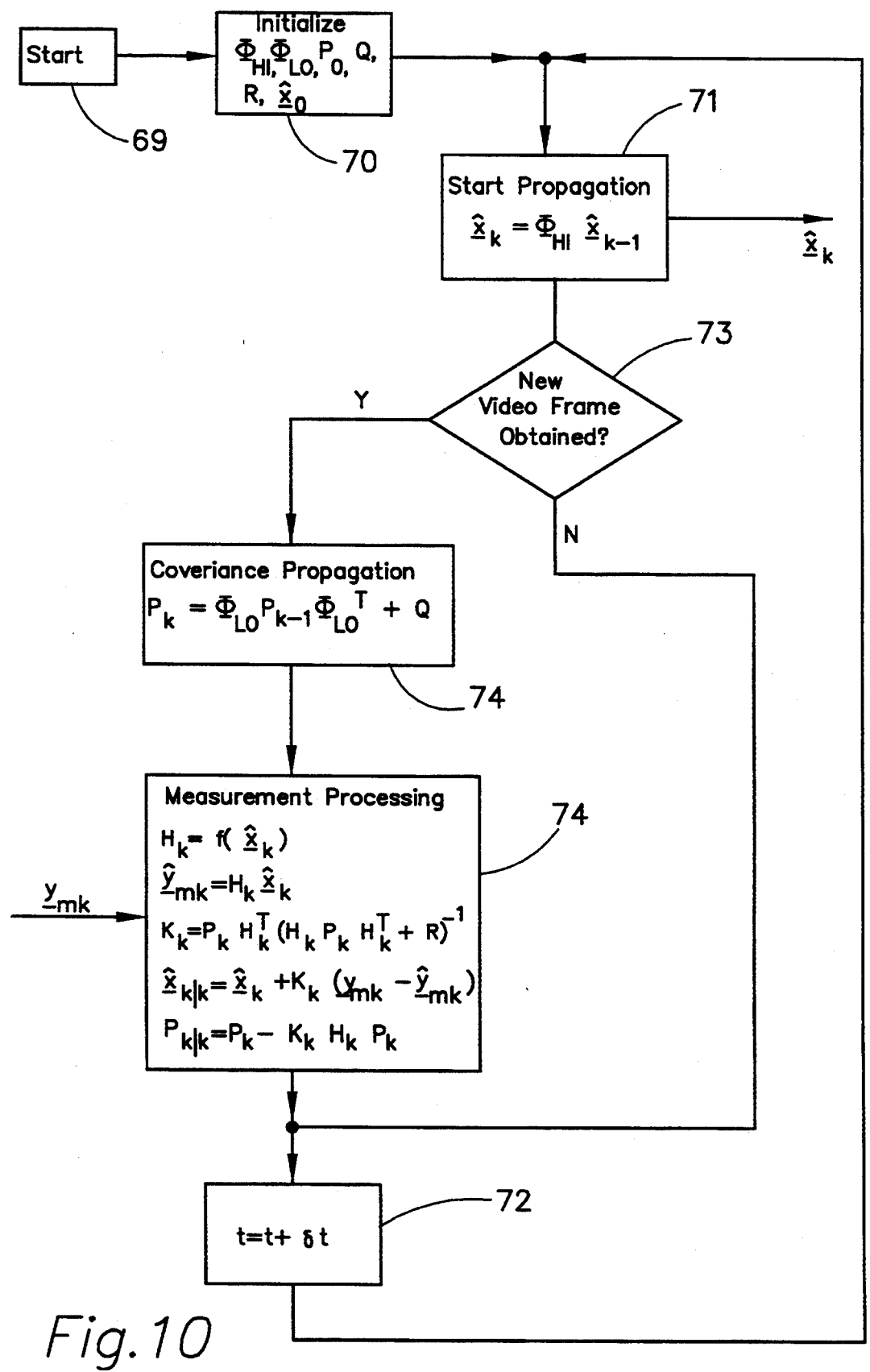
FIG. 10 is a flow diagram of the Kalman filter for the tracker.

FIG. 10 is a functional flow diagram of the Kalman filter 15 process. Triggering signal 69 from track point 3-D location and helmet LOS 33, initializes Kalman filter 15 at block 70. The output goes to state propagation block 71 for determining the time state that the system is in, or receiving a time increment signal from block 72. Output of block 71 goes to decision symbol 73 which determines whether a new video frame is present. If not and t of block 72 is incremented to the next time state with an output to block 71, then states are propagated forward and $\underline{x}_{k/k-1}$ is output from block 71. If the answer is yes, then a signal goes to the covariance propagation block 74 which has an output onto measurement processing block 75. Note that state propagation block 71 outputs position estimates $\underline{x}_k$, which are the output of Kalman filter 15; however, $\underline{x}_k = \underline{x}_{k/k}$ when the estimate is based on a measurement, and $\underline{x}_k = \underline{x}_{k/k-1}$ when the estimate is based on an estimate. The other input to block 75 includes measurement signals $\underline{y}_{mk}$ from track point 3-D location and helmet LOS 33.

In FIG. 10, subscript "k" is the indication of a time state for the video frame. Subscript "k/k" indicates a revised estimate as a result of current measurements. The capital letters are matrices, the small letters are vectors except for the t's of block 72, and the superscripts and the subscripts. Superscript "−1" indicates matrix inverse and superscript "T" indicates transposed matrix. Capital K is a Kalman filter gain factor. The carat " ^ " over the "x" or "y" symbol means that the x or y is an estimate. "H" is an observation matrix. Underlined "x" or "y" means the term is a multidimensional vector such as a 3-D spatial coordinate. Subscript "HI" means high; "LO" means low.

As in any filtering application, selection of the filter bandwidth represents a tradeoff between too little filtering, which does not adequately attenuate random measurement errors, and too much filtering, which causes excessive lag in the estimated quantities. For system 10 of camera 11, the filter design parameters are chosen so as to introduce no more than 0.1 second lag into the filtered outputs. Given that six video frames are collected every 0.1 second, the effect of the filtering on measurement errors that vary randomly from frame to frame is to reduce them by a factor of $\sqrt{6}$, or about 2.4. Errors that are correlated from frame to frame will see less attenuation. The following table shows head centroid position and Euler angle errors (rms) for the unfiltered and filtered approaches.

Two approaches to signal filtering were evaluated, which are denoted the "decoupled" and "coupled" approaches. In the decoupled approach, a two-state Kalman estimator of the random velocity type was used for each of the six inputs (x-y-z positions and the three Euler angles, roll-pitch-yaw). In the coupled-filter approach, the algorithm accounts for the natural coupling between translational and rotational motions of the head. In other words, this model attributes a large portion of the translational motion to a rotation about a point 17 (FIG. 4) representing the base of the neck. The dynamical model used to represent this filter design are a process model and a measurement model. The process model, as a basis of Kalman filter 15, defines new data (estimates) as a function of estimates to establish $\Phi$. The measurement model, as a basis of Kalman filter 15, defines new data (estimates) as a function of measurements to establish H. The following lays out the models.

Process Model −

$$\dot{x} = v_x + [0.2[\cos\psi\sin\theta\cos\phi - \sin\psi\sin\phi]$$
$$+ 0.13\cos\psi\cos\theta]w_\psi$$
$$+ [0.2\sin\psi\cos\theta\cos\phi - 0.13\sin\psi\sin\theta]w_\theta$$
$$+ [0.2[\cos\psi\cos\phi - \sin\psi\sin\theta\sin\phi]] w_\phi$$

-continued $$\dot{V}_x = \eta_{vx}$$

$$\dot{Y} = V_y + [0.2[\sin\psi\sin\theta\cos\phi + \cos\psi\sin\phi]$$
$$+ 0.13\sin\psi\sin\theta]w_\psi$$
$$+ [0.13\cos\psi\sin\theta - 0.2\cos\psi\cos\theta\cos\phi]w_\theta$$
$$+ [0.2[\cos\psi\sin\theta\sin\phi + \sin\psi\cos\phi]] w_\phi$$

$$\dot{V}_y = \eta_{vy}$$
$$E[\eta_{vy}(t)\eta_{vy}(\tau)] = q_v\delta(t - \tau)$$

$$\dot{Z} = V_z - [0.2\sin\theta\cos\phi + 0.13\cos\theta]w_\theta$$
$$- 0.2\cos\theta\sin\phi w_\phi$$

$$\dot{V}_z = \eta_{vz}$$
$$E[\eta_{vz}(t)\eta_{vz}(\tau)] = q_v\delta(t - \tau)$$
$$\dot{\psi} = w_\psi$$
$$\dot{w}_\psi = \eta_{w\psi}$$
$$E[\eta_{w\psi}(t)\eta_{w\psi}(\tau)] = q_w\delta(t - \tau)$$

$$\dot{\theta} = w_\theta$$
$$\dot{w}_\theta = \eta_{w\theta}$$
$$E[\eta_{w\theta}(t)\eta_{w\theta}(\tau)] = q_w\delta(t - \tau)$$

$$\dot{\phi} = w_\phi$$
$$\dot{w}_\phi = \eta_{w\phi}$$
$$E[\eta_{w\phi}(t)\eta_{w\phi}(\tau)] = q_w\delta(t - \tau)$$

$$X_m = X + \eta_x$$
$$E[\eta_x^2] = E[\eta_y^2] = E[\eta_z^2] = r_{xyz}$$
$$Y_m = Y + \eta_y$$
$$Z_m = Z + \eta_z$$
$$\psi_m = \psi + \eta_\psi$$
$$E[\eta_\psi^2] = E[\eta_\theta^2] = E[\eta_\phi^2] = r_{\psi\theta\phi}$$
$$\theta_m = \theta + \eta_\theta$$
$$\phi_m = \phi + \eta_\phi$$

Where the state vector is:

$$x = [x, y, z, \phi, \theta, \psi, v_x, v_y, v_z, w_\phi, w_\theta, w_{104}]^T$$

$x_r$ is the x coordinate of the reference point of the configuration of five gradient reflectors, measured relative to reference or vehicle coordinates;

$y_r$ is the y coordinate of the reference point, measured relative to reference coordinates;

$z_r$ is the z coordinate of the reference point, measured relative to reference coordinates;

$\phi$ is the roll of the body coordinate system, measured relative to reference coordinates;

$\theta$ is the pitch of the body coordinate system, measured relative to reference coordinates;

$\psi$ is the yaw of the body coordinate system, measured relative to reference coordinates;

$v_x$ is the x component of the velocity of the base 17 of the neck;

$v_y$ is the y component of the velocity of the base 17 of the neck;

$v_z$ is the z component of the velocity of the base 17 of the neck;

$w_\phi$ is the angular roll rate of the body coordinate system, measured relative to reference coordinates;

$w_\theta$ is the angular pitch rate of the body coordinate system, measured relative to reference coordinates; and $w_\psi$ is the angular yaw rate of the body coordinate system, measured relative to reference coordinates.

New estimates of the state vector $\underline{x}_{k+1}$ are calculated from the current time estimate $\underline{x}_k$ with the following state propagation equation:

$x_{k+1} = \Phi_{HI} x_k$

The covariance matrix $P_{k+1}$ is calculated with the covariance propagation equation:

$$P_{k+1} = \Phi_{LO} P_k \Phi_{LO}^T + Q$$

where $$\Phi_{HI} = \Phi_{LO} = \begin{vmatrix} 1 & 0 & 0 & 0 & 0 & 0 & \Delta t & 0 & 0 & 0 & 0 \\ 0 & 1 & 0 & 0 & 0 & 0 & 0 & \Delta t & 0 & 0 & 0 \\ 0 & 0 & 1 & 0 & 0 & 0 & 0 & 0 & \Delta t & 0 & 0 \\ 0 & 0 & 0 & 1 & 0 & 0 & 0 & 0 & 0 & \Delta t & 0 \\ 0 & 0 & 0 & 0 & 1 & 0 & 0 & 0 & 0 & 0 & \Delta t \\ 0 & 0 & 0 & 0 & 0 & 1 & 0 & 0 & 0 & 0 & \Delta t \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{vmatrix}$$

$\Delta t = 1/60$ second for $\Phi_{LO}$,
$\Delta t = 1/420$ second for $\Phi_{HI}$,
$Q = \text{diag}[0,0,0,0,0,0,q_v,q_v,q_v,q_w,q_w,q_w] \cdot \Delta t$, $q_v$ = velocity random walk parameter = $[5(\text{cm/sec})/\sqrt{\text{sec}}]^2$, $q_w$ = angular rate random walk parameter = $[1(\text{rad/sec})/\sqrt{\text{sec}}]^2$, $\Delta t$ = propagation time step,
$x_o = [0,0 \ldots ,0]^T$,
$P_o = \text{diag}[\sigma_{pos}^2, \sigma_{pos}^2, \sigma_{pos}^2, \sigma_{angle}^2, \sigma_{angle}^2, \sigma_{angle}^2, \sigma_{vel}^2, \sigma_{vel}^2, \sigma_{vel}^2, \sigma_{rate}^2, \sigma_{rate}^2, \sigma_{rate}^2]$,
$\sigma_{pos}^2 = (10 \text{ cm})^2$,
$\sigma_{angle}^2 = (1 \text{ rad.})^2$,
$\sigma_{vel}^2 = (10 \text{ cm/sec})^2$,
$\sigma_{rate}^2 = (1 \text{ rad./sec.})^2$,
$r_{xyz} = (0.05 \text{ cm})^2$,
$r_{\phi\theta\phi} = (0.005 \text{ rad.})^2$, and
$R = \text{diag}[r_{xyz}, r_{xyz}, r_{xyz}, r_{\psi\theta\phi}, r_{\psi\theta\phi}, r_{\psi\theta\phi}]$.

To evaluate the performance of the two filter design approaches, we used a sample trajectory simulating repeated head transitions between a head-down orientation (looking at instruments) and a head-up orientation (looking out). Expected sensing errors were superimposed on the truth trajectory data to provide measurements of y and z position and the Euler angle $\theta$. The filter designs used this input data to estimate these three quantities and their derivatives.

The following table shows a summary of the root-mean-square estimation error results obtained with the coupled and decoupled filter designs. Since the coupled filter design depends on the knowledge of the distance between the base of the neck (pivot point 17) and the reference point 38 on the head, the sensitivity of mismatch between the true lever arm and the filter's assumed value was also investigated. This table also lists the one-sigma errors on the position and angle measurements provided as input to the filters. Several observations can be made based on the data in the table. First, the coupled filter substantially outperforms the decoupled design, particularly with regard to the translational velocity estimates. Second, the coupled filter is fairly sensitive to error in the assumed base-of-neck-to-reference-point lever arm 20 length; however, even with a 20 percent mismatch between the assumed and true values, performance was noticeably better than the decoupled design. Third, expected accuracies are better than 0.5 cm in position and 0.5 degree in angle (one-sigma errors).

| Case | y (cm) | y (cm/sec) | z (cm) | z (cm/sec) | θ (cm) | θ (deg/sec) |
|---|---|---|---|---|---|---|
| Unfiltered (inputs) | 0.45 | — | 0.05 | — | 0.56 | — |
| Decoupled filters | 0.44 | 4.6 | 0.05 | 1.9 | 0.42 | 12.5 |
| Coupled filter | 0.44 | 1.9 | 0.04 | 0.7 | 0.38 | 10.8 |
| Coupled, 10% mismatch in neck lever arm | 0.44 | 2.4 | 0.04 | 0.9 | 0.38 | 11.0 |
| Coupled, 20% mismatch in neck lever arm | 0.44 | 3.1 | 0.04 | 1.1 | 0.39 | 11.2 |

The following listing is a program for Kalman filter 15. Part I shows the program data allocation or storage specification. Several instances of terms include xv(ns) as a state vector, p(ns,ns) as a current estimate of covariance of Kalman filter states, q(ns) as a measurement variance, h(ns) as an observation matrix, rm(nm) as a residual estimate for measurements, and ym(nm) as actual measurements. Part II is a miscellaneous initialization where various values are inserted. Part III provides for the in/out interface of the Kalman filter. Part IV provides sensor data values for simulation. Part V has values provided for various time constants of each of the states of the process. Part VI reveals initialization of the states of the Kalman filter and the covariance matrices. The process noise covariance matrix is set for a fixed propagation time step and nonvarying elements are set for the state transition matrix. Part VII involves making initial estimates of noise variance in order to set the initial state of Kalman filter 15. The time loop is started in part VIII and the measurement data (ym) and the truth data (xt) are measured. If the system is in a simulated data mode then simulated truth and measurement data are generated. Otherwise, actual data is read in this part. Part IX involves state propagation and calculates new states based on prior information without the new measurements. Part X provides for covariance propagation. Part XI involves measurement processing (at video rates) wherein the degree of dependency between the sensor data with actual estimates of system states is established and a new observation matrix is calculated. Part XII sets forth a covariance matrix for predicted measurements. Part XIII involves the transferring out of already made calculations via an output array. The x-out symbol is a predicted measurement. It is the quantity which may be used to predict image plane coordinates of the helmet-mounted reflectors 12. x-out is part of the array hxout. Other elements of hxout are relevant only to the simulations such as truth data, errors relative to truth, and estimates of process noise.

Subpart A of part XIV reveals a subroutine which is called by the program and uses a mathematical approach to create noise. Subpart B is another subroutine which is a mathematical matrix utility which multiplies a square matrix by a line vector or linear chain of data. Subpart C is a mathematical matrix utility that multiplies matrices. Subpart D is a subroutine that transposes one matrix and then multiplies it with another. Subpart E is a subroutine that provides the dot product of vectors.

I. program htkf12 parameter (ns=12)
   parameter (nm=6)

double precision time
   character*128 arg1,arg2 dimension xv(ns),p(ns,ns),q(ns),h(ns),rm(nm),ym(nm)
   dimension phi_hi(ns,ns),phi_lo(ns,ns),ck(ns),tv(ns),ta(ns,ns)
   dimension hxout(5,6),xt(6)
   dimension x_out(6),cc(6,6),p_out(6,6),error(3,6)

data rad2deg/57.29578/
   data twopi/6.28319/

II. Miscellaneous Initialization dt_hi = 1./420.
   dt_lo = 1./60.
   tmax = 5.0
   rn = 20.
   k = 6
   isimdat = 0

III. File I/O if(isimdat.eq.0) then call getarg(1,arg1)
      open(1,file=arg1,form='unformatted')
      read(1)

call getarg(2,arg2)
      open(2,file=arg2,form='unformatted')
      read(2)

endif open(3,file='out',form='unformatted')
   write(3) 5,6,1,1 open(4,file='err',form='unformatted')
   write(4) 3,6,1,1 open(7,file='states',form='unformatted')

write(7) 1,12,1,1

IV. Simulated Sensor Data Parameters (sinusoids in x/y/z/phi/tht/psi)
    (simulated random error one-sigma values in cm, radians)

if(isimdat.eq.1) then amp_x = 5.
      amp_y = 5.
      amp_z = 2.
      amp_phi = 20./rad2deg
      amp_tht = 20./rad2deg
      amp_psi = 20./rad2deg
      w_x = twopi/2.
      w_y = twopi/2.
      w_z = twopi/2.
      w_phi = twopi/2.
      w_tht = twopi/2.
      w_psi = twopi/2.
      phs_x = 0./rad2deg
      phs_y = 60./rad2deg
      phs_z = 120./rad2deg
      phs_phi = 180./rad2deg
      phs_tht = 240./rad2deg
      phs_psi = 300./rad2deg sig_pos = 0.05
      sig_ang = 0.005 endif

V. These values for process and meas. noise give about 0.02 sec lag
   for measurements processed every 1/60 sec.
   vrw = 5.*25.
   raterw = 1.0*25.
   pos_rand = 0.05
   ang_rand = 0.005

These values for process and meas. noise give about 0.5 sec lag
   for measurements processed every 1/60 sec.
   vrw = 5./25.
   raterw = 1.0/25.
   pos_rand = 0.05
   ang_rand = 0.005

These values for process and measurement noise give about 0.1 sec lag for measurements processed every 1/60 sec.
vrw = 5.
raterw = 1.0
pos_rand = 0.05
ang_rand = 0.005

VI. Initialize Kalman Filter State Vector (xv) and Covariance Matrix (p).
Set Process Noise Covariance Matrix (q) for Fixed Propagation Time Step.
Define State Transition Matrix (phi_hi for high rate, phi_lo for video frame rate).

```
   do 10 i=1,ns
     xv(i) = 0.
       q(i) = 0.
        do 5 j=1,ns
          p(i,j) = 0.
          phi_hi(i,j) = 0.
          phi_lo(i,j) = 0.
 5    continue
10 continue spos = 10.
   svel = 10.
   sangle = 1.0
   srate = 1.0
   p(1,1) = spos*spos
   p(2,2) = spos*spos
   p(3,3) = spos*spos
   p(4,4) = sangle*sangle
   p(5,5) = sangle*sangle
   p(6,6) = sangle*sangle
   p(7,7) = svel*svel
   p(8,8) = svel*svel
   p(9,9) = svel*svel
   p(10,10) = srate*srate
   p(11,11) = srate*srate
   p(12,12) = srate*srate q(7)  = vrw*vrw*dt_lo
   q(8)  = vrw*vrw*dt_lo
   q(9)  = vrw*vrw*dt_lo
   q(10) = raterw*raterw*dt_lo
   q(11) = raterw*raterw*dt_lo
   q(12) = raterw*raterw*dt_lo do 20 i=1,ns
       phi_hi(i,i) = 1.0
```

```
        phi_lo(i,i) = 1.0
20 continue phi_hi(1,7)  = dt_hi
    phi_hi(2,8)  = dt_hi
    phi_hi(3,9)  = dt_hi
    phi_hi(4,10) = dt_hi
    phi_hi(5,11) = dt_hi
    phi_hi(6,12) = dt_hi phi_lo(1,7)  = dt_lo
    phi_lo(2,8)  = dt_lo
    phi_lo(3,9)  = dt_lo
    phi_lo(4,10) = dt_lo
    phi_lo(5,11) = dt_lo
    phi_lo(6,12) = dt_lo
```

VII. Measurement Noise Variance

```
    rm(1) = pos_rand**2
    rm(2) = pos_rand**2
    rm(3) = pos_rand**2
    rm(4) = ang_rand**2
    rm(5) = ang_rand**2
    rm(6) = ang_rand**2
```

VIII. Start Time Loop; Read Measurement Data (ym) and Truth Data (xt)
    (if in simulated data mode, generate simulated truth and measurement data)

```
30 time = time + dt_hi
   k = k + 1 if(isimdat.eq.1) then
      xs = amp_x*cos(w_x*time + phs_x)
      ys = amp_y*cos(w_y*time + phs_y)
      zs = amp_z*cos(w_z*time + phs_z)
      phis = amp_phi*cos(w_phi*time + phs_phi)
      thts = amp_tht*cos(w_tht*time + phs_tht)
      psis = amp_psi*cos(w_psi*time + phs_psi)
      sphis = sin(phis)
      cphis = cos(phis)
      sthts = sin(thts)
      cthts = cos(thts)
      spsis = sin(psis)
      cpsis = cos(psis)
```

```
        xt(1) = xs - 0.13 * (cpsi*sphi*stht-spsi*ctht) +
*                 0.2 * (cpsi*sphi*ctht+spsi*stht)
        xt(2) = ys - 0.13 * (spsi*sphi*stht+cpsi*ctht) +
*                 0.2 * (spsi*sphi*ctht-cpsi*stht)
        xt(3) = zs - 0.13 * cphi*stht + 0.2 * cphi*ctht
    xt(4) = phis
    xt(5) = thts
    xt(6) = psis
    if (k.ge.7) then
        k = 0
        imeas = 1
        ym(1) = xt(1) + sig_pos*rnorm()
        ym(2) = xt(2) + sig_pos*rnorm()
        ym(3) = xt(3) + sig_pos*rnorm()
        ym(4) = xt(4) + sig_ang*rnorm()
        ym(5) = xt(5) + sig_ang*rnorm()
        ym(6) = xt(6) + sig_ang*rnorm()
    else
        imeas = 0
    endif
  else
    if (k.ge.7) then
        k = 0
        imeas = 1
        read(1,end=200) dum,(ym(n),n=1,6)
        read(2,end=200) dum,(xt(n),n=1,6)
    else
        imeas = 0
    endif
  endif
endif
```

IX. State Propagation (at high rate; 420 Hz here)

```
    call mvau (phi_hi,xv,tv,ns,ns,ns,ns,ns)

do 50 i=1,ns
       xv(i) = tv(i)
 50 continue
```

X. Covariance Propagation (only done at video update rate)

(Note: real-time application may be used as fixed gain filter, with enormous savings in throughput requirements. If not, two improvements can be considered: (1) change to U-D mechanization for better numerical properties, and (2) take advantage of all the sparseness in the state transition matrix for reduced throughput needs.)

```
     if(imeas.eq.1) then call mab (phi_lo,p,ta,ns,ns,ns,ns,ns,ns)
        call mabt(ta,phi_lo,p,ns,ns,ns,ns,ns,ns)
        do 60 i=1,ns
          p(i,i) = p(i,i) + q(i)
60      continue
```

XI. Measurement Processing (at video rate)

```
        do 110 m=1,nm do 70 i=1,ns
            h(i) = 0.
70        continue if(m.le.3) then
            phi = xv(4)
            tht = xv(5)
            psi = xv(6)
            sphi = sin(phi)
            cphi = cos(phi)
            stht = sin(tht)
            ctht = cos(tht)
            spsi = sin(psi)
            cpsi = cos(psi)
          endif
          if(m.eq.1) then yhat = xv(1) - 0.13 * (cpsi*sphi*stht-spsi*ctht) +
     *             0.2 * (cpsi*sphi*ctht+spsi*stht)
            h(1) = 1.0
            h(4) = -0.13 * (cpsi*sphi*ctht+sphi*stht) +
     *             0.2 * (-cpsi*sphi*stht+spsi*ctht)
            h(5) = -0.13 * (cpsi*cphi*stht) +
     *             0.2 * (cpsi*cphi*ctht)
            h(6) = 0.13 * (spsi*sphi*stht+cphi*ctht) +
     *             0.2 * (-spsi*sphi*ctht+cpsi*stht)

elseif(m.eq.2) then yhat = xv(2) - 0.13 * (spsi*sphi*stht+cpsi*ctht) +
     *             0.2 * (spsi*sphi*ctht-cpsi*stht)
            h(2) = 1.0
            h(4) = - 0.13 * (spsi*sphi*ctht-cpsi*stht) +
     *             0.2 * (-spsi*sphi*stht-cpsi*ctht)
            h(5) = - 0.13 * (sphi*cphi*stht) +
```

```
   *              0.2 * (spsi*cphi*ctht)
           h(6) = - 0.13 * (cphi*sphi*stht-spsi*ctht) +
   *              0.2 * (cpsi*sphi*ctht+spsi*stht)

elseif(m.eq.3) then yhat = xv(3) - 0.13 * cphi*stht + 0.2 * cphi*ctht
          h(3) = 1.0
          h(4) = - 0.13 * cphi*ctht - 0.2 * cphi*stht
          h(5) = 0.13 * sphi*stht - 0.2 * sphi*ctht elseif(m.eq.4) then yhat = xv(4)
          h(4) = 1.0 elseif(m.eq.5) then yhat = xv(5)
          h(5) = 1.0 elseif(m.eq.6) then yhat = xv(6)
          h(6) = 1.0 endif
       do 80 j=1,6
         cc(m,j) = h(j)
80     continue r = rm(m)

res = ym(m) - yhat call mvau (p,h,tv,ns,ns,ns,ns,ns)
       rescov = dotuv(h,tv,ns,ns,ns) + r do 90 i=1,ns
         ck(i) = tv(i)/rescov
         xv(i) = xv(i) + ck(i)*res
90     continue do 100 i=1,ns
         do 95 j=1,ns
            p(i,j) = p(i,j) - tv(i)*ck(j)
95       continue
         if(p(i,i) .le. 0.0) write(6,*) 'Neg Cov, i =',i
```

```
100    continue 110    continue
```

XII. Covariance matrix for predicted measurements (p_out = cc * p * cc')

```
       call mab(cc,p,ta,6,6,6,6,ns,ns)
       call mabt(ta,cc,p_out,6,6,6,ns,6,6)

endif
```

XIII. Output Arrays (x_out is the predicted measurement. It is the quantity which would be used to predict image plane coordinates of the helmet-mounted reflectors.) x_out is part of the array hxout. The other elements of hxout are really only relevant to simulations (ie. truth data, errors relative to truth, etc.)

```
    phi = xv(4)
    tht = xv(5)
    psi = xv(6)
    sphi = sin(phi)
    cphi = cos(phi)
    stht = sin(tht)
    ctht = cos(tht)
    spsi = sin(psi)
    cpsi = cos(psi)
    x_out(1) = xv(1) - 0.13 * (cpsi*sphi*stht-spsi*ctht) +
   *                   0.2 * (cpsi*sphi*ctht+spsi*stht)
    x_out(2) = xv(2) - 0.13 * (spsi*sphi*stht+cpsi*ctht) +
   *                   0.2 * (spsi*sphi*ctht-cpsi*stht)
    x_out(3) = xv(3) - 0.13 * cphi*stht + 0.2 * cphi*ctht x_out(4) = xv(4)
    x_out(5) = xv(5)
    x_out(6) = xv(6)

do 120 j=1,6
       hxout(1,j) = x_out(j)
       hxout(2,j) = xt(j)
       hxout(3,j) = ym(j)
       hxout(4,j) = x_out(j) - xt(j)
       hxout(5,j) = ym(j) - xt(j)
120 continue c  if(imeas.eq.1) write(3) sngl(time),hxout
```

```
       write(3) sngl(time),hxout
       if(imeas.eq.1) write(7) sngl(time),xv do 130 j=1,6
        error(1,j) = x_out(j) - xt(j)
130  continue
     do 140 j=1,6
       error(2,j) = sqrt(p_out(j,j))
       error(3,j) =-sqrt(p_out(j,j))
140  continue if(imeas.eq.1) write(4) sngl(time),error if(time.lt.tmax) go to 30

200  continue
     stop
     end
```

XIV. rnorm

A. function rnorm ()

This function generates zero-mean, unit-variance, uncorrelated Gaussian random numbers using the UNIX uniform [0,1] random number generator 'rand'.

```
rnorm = sqrt(-2.*alog(rand(0)))*cos(6.283185307*rand(0))
return
end
```

B. subroutine mvau

Function : multiply a matrix and a vector to produce a vector:

$$v = a * u$$

Note: v cannot be u.

Inputs :
- a    input matrix
- u    input vector
- m    row dimension of input matrix and output vector effective in the operation
- n    column dimension of input matrix and dimension of input vector effective in the operation mra actual row dimension of input matrix
mru actual dimension of input vector
mrv actual dimension of output vector Outputs :
 v  output vector subroutine mvau (a,u,v,m,n,mra,mru,mrv)

dimension a(mra,1),u(mru),v(mrv)
 double precision sum do 20 i = 1,m
  sum = 0.d0
  do 10 j = 1,n
   sum = sum + a(i,j)*u(j)
10  continue
  v(i) = sum
20 continue return
 end C. subroutine mab Function : perform matrix multiplication c = a * b Inputs :
 a input matrix
 b input matrix
 m row dimension of a for the purpose of matrix multiplication
 l column dimension of a
  also row dimension of b
  for the purpose of matrix multiplication
 n column dimension of b for the purpose of matrix multiplication
 mra actual row dimension of a
 mrb actual row dimension of b
 mrc actual row dimension of c Outputs :
 c matrix product of a and b Note:
 c cannot be a or b.

```
      subroutine mab (a,b,c,m,l,n,mra,mrb,mrc)
      dimension a(mra,1),b(mrb,1),c(mrc,1)
      double precision sum do 30 i = 1,m
        do 20 j = 1,n
          sum = 0.d0
          do 10 k = 1,l
            sum = sum + a(i,k)*b(k,j)
10        continue
          c(i,j) = sum
20      continue
30    continue return
      end
```

D.  subroutine mabt

Function : perform matrix multiplication c = a * trans(b)

Inputs :
    a    input matrix
    b    input matrix
    m    row dimension of a for the purpose of matrix multiplication
    l    column dimension of a
        also row dimension of b
        for the purpose of matrix multiplication
    n    column dimension of b for the purpose of matrix multiplication
    mra    actual row dimension of a
    mrb    actual row dimension of b
    mrc    actual row dimension of c Outputs :
    c    matrix product of a and trans(b)

Note:
  c cannot be a or b.

```
      subroutine mabt (a,b,c,m,l,n,mra,mrb,mrc)
      dimension a(mra,1),b(mrb,1),c(mrc,1)
      double precision sum do 30 i = 1,m
        do 20 j = 1,n
```

```
          sum = 0.d0
          do 10 k = 1,l
            sum = sum + a(i,k)*b(j,k)
10        continue
          c(i,j) = sum
20      continue
30    continue return
      end
```

E.   function dotuv

Function : perform the dot product of two vectors

Inputs :
   u     input vector
   v     input vector
   n     dimension of u,v over which dot
         product is performed
   mru   dimension of u
   mrv   dimension of v Outputs :
   value of function = dot product (u,v)

```
      function dotuv (u,v,n,mru,mrv)

dimension u(mru),v(mrv)
      double precision sum
      sum = 0.d0
      do 10 i = 1,n
        sum = sum + u(i)*v(i)
10    continue
      dotuv = sum return
      end
```

We claim:

1. A multi-band videometric tracking system comprising:
   an ultraviolet light source for emanating ultraviolet light;
   at least one gradient reflector for reflecting the ultraviolet light from said light source;
   a camera for detecting the ultraviolet light reflected from said gradient reflector; and
   reflector location estimator connected to said camera;
   a rigid-body Kalman filter, connected to said reflector location estimator, for processing signals from said reflector location estimator and determining location of said gradient reflector.

2. A multi-band videometric tracking system comprising:
   a light source for emanating light;
   a constellation of at least three coplaner gradient reflectors and one non-coplaner gradient reflector, situated on a helmet, for reflecting the light from said light source;
   a video camera for detecting the light reflected from said constellation;

a subpixel spot location estimator algorithmic processor, implemented in a processor which utilizes video signals from said camera to establish image plane coordinates of said constellation to within a fraction of a pixel;

a helmet three-dimensional (3-D) location and line of sight (LOS) calculation algorithmic processor which utilizes the image plane coordinates calculated by said subpixel spot location estimator algorithmic processor; and a rigid-body Kalman filter implemented in a processor, connected to said 3-D location and LOS calculation algorithmic processor, for determining location of said constellation to a certain degree of precision and estimating the helmet 3-D location and body coordinate LOS at a rate faster than an actual measurement rate, via a state propagation.

3. A multi-band high-speed videometric helmet tracking system comprising:

a light source;

at least one gradient reflector situated proximate to said light source;

a camera proximate to said gradient reflector;

a subpixel spot location estimator connected to said camera;

a track point three-dimensional location and helmet line-of-sight estimator connected to said subpixel spot location estimator; and a rigid-body Kalman filter predictor connected to said track point 3-D location and helmet line-of-sight estimator.

4. A multi-band videometric tracking system comprising:

a helmet having a constellation of gradient reflectors;

a light source aimed at the constellation of gradient reflectors;

a camera, directed toward the constellation of reflectors, for sensing spots of light reflected by the constellation of reflectors and providing images having information about the spots of light;

a subpixel spot location estimator for receiving images having information about the spots of light, and for processing the information about each spot of light into spot location information having a location accuracy within a pixel tolerance of the images;

wherein the processing of the information for each spot of light comprises: first histogram thresholding the images to a first output;

Gaussian window smoothing the images to a second output;

Sobel operating the second output to a third output;

second histogram thresholding the third output to a fourth output;

first feature extracting the first output to a fifth output;

second feature extracting the fourth output to a sixth output;

first calculating of minimum orthogonal distance line coefficients from the fifth output to a seventh output;

second calculating of minimum orthogonal distance line coefficients from the sixth output to an eighth output; and boresight calculating of seventh and eighth outputs to a ninth output;

a three-dimensional location and orientation processor for processing information from the ninth output into a tenth output; and a rigid-body Kalman filter for processing the tenth output into an eleventh output having estimates for helmet coordinates and helmet line of sight.

* * * * *